United States Patent [19]

Horsch

[11] Patent Number: 4,934,502
[45] Date of Patent: Jun. 19, 1990

[54] CLUTCH ASSEMBLY WITH BELLEVILLE SPRINGS

[75] Inventor: Joachim Horsch, Lombard, Ill.

[73] Assignee: J. I. Case Company, Racine, Wis.

[21] Appl. No.: 184,813

[22] Filed: Apr. 22, 1988

[51] Int. Cl.$^5$ ............................................. F16D 25/063
[52] U.S. Cl. ............................ 192/85 AA; 192/109 F
[58] Field of Search ......... 192/85 AA, 109 F, 109 A, 192/52

[56] References Cited

U.S. PATENT DOCUMENTS

| | | | |
|---|---|---|---|
| 2,251,366 | 8/1941 | Miller et al. | 192/109 A |
| 3,054,491 | 9/1962 | Bloch et al. | 192/109 F X |
| 3,353,641 | 11/1967 | Chana | 192/85 AA |
| 3,814,226 | 6/1974 | White | 192/85 AA |
| 3,819,020 | 6/1974 | Smith | 192/85 AA X |
| 4,090,597 | 5/1978 | Folomin et al. | 192/85 AA |
| 4,265,346 | 5/1981 | Emmadi | 192/109 F X |
| 4,371,066 | 2/1983 | Fujioka et al. | 192/85 AA |
| 4,541,515 | 9/1985 | Nishimura et al. | 192/85 AA |
| 4,623,055 | 11/1986 | Ohkubo | 192/85 AA |
| 4,713,984 | 12/1987 | Ohkubo | 192/85 AA X |
| 4,730,713 | 3/1988 | Pickard et al. | 192/85 AA |

Primary Examiner—Rodney H. Bonck
Attorney, Agent, or Firm—Dressler, Goldsmith, Shore, Sutker & Milnamow, Ltd.

[57] ABSTRACT

A clutch assembly is provided for selectively establishing a drive connection between a pair of relatively rotatable members. The clutch assembly includes a series of interleaved plates operably effective when axially compressed to couple the rotatable members. A fluid pressure operated clutch actuator is provided for effecting clutch engagement and regulating the torque carrying capacity of the clutch assembly. The clutch actuator includes an annular clutch engaging face area. The present invention contemplates arranging a series of deflectable springs between the annular face area on the clutch actuator and the interleaved plates to provide a gradual deceleration of the clutch actuator during clutch engagement in a manner significantly reducing impact loading and associated torque peak to the clutch assembly.

8 Claims, 2 Drawing Sheets

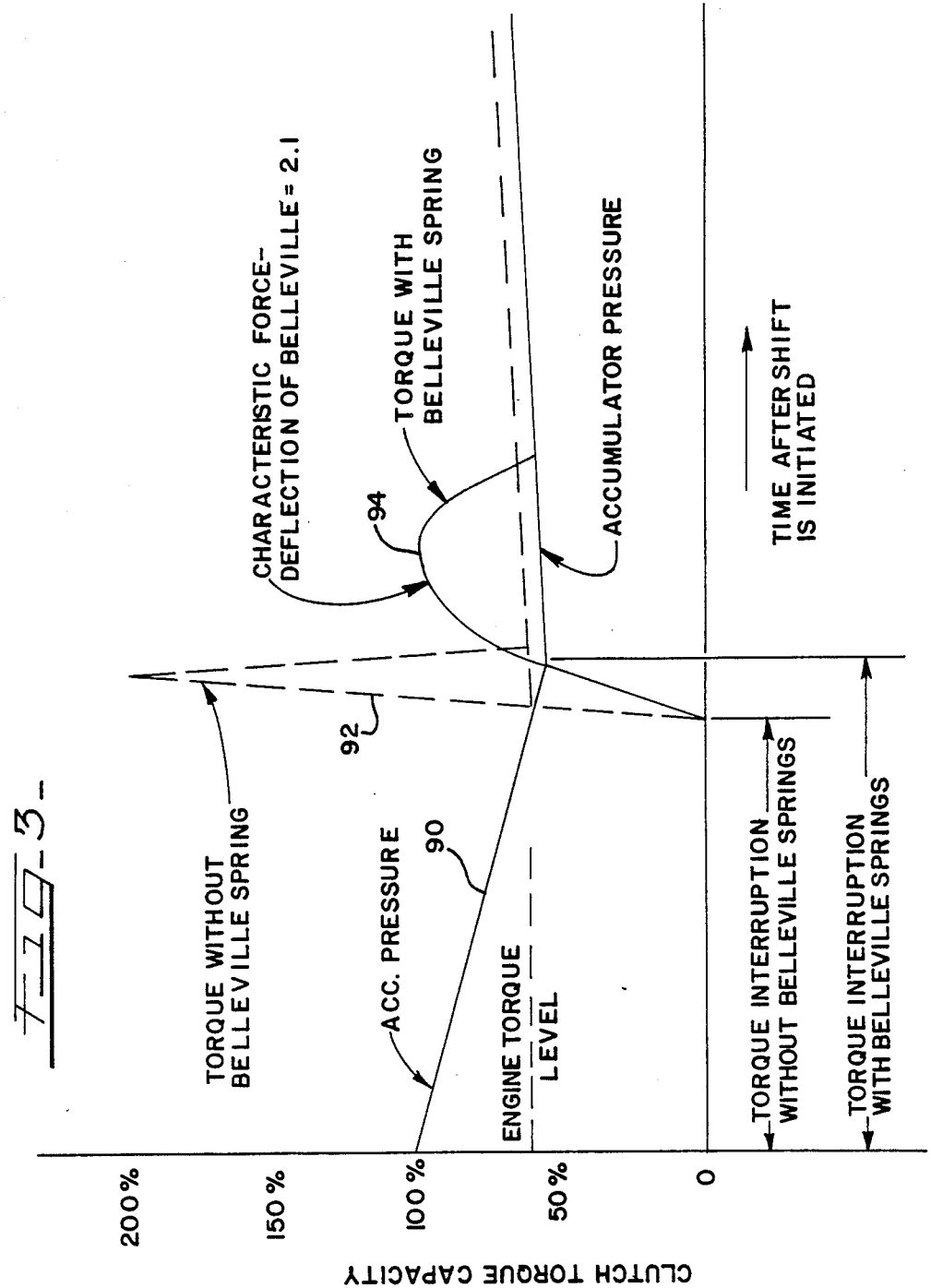

CLUTCH ASSEMBLY WITH BELLEVILLE SPRINGS

TECHNICAL FIELD

The present invention relates generally to a fluid pressure actuated clutch mechanism for a tractor transmission and, more particularly, to a fluid pressure actuated clutch mechanism designed to reduce a torque peak upon initial application of the clutch mechanism to thereby improve shift quality.

BACKGROUND OF THE INVENTION

In relatively large tractors and/or other agricultural implements, a multiple ratio gear drive assembly is usually provided as an integral part of a power train assembly. The gear drive assembly includes a plurality of hydraulically actuated power-shift clutch assemblies serially arranged within a limited space to allow the gear drive assembly to rapidly shift from one gear ratio to another. The clutch assemblies are sequentially operated to connect/disconnect a rotating input member and rotational output members until a desired speed for the tractor or the like is accomplished.

A typical hydraulic clutch assembly includes a plurality of interleaved clutch plates alternate ones of which are spline connected to and rotate with a rotating input member and the remainder of which are spline connected to and rotate with a rotational output member. These interleaved clutch plates transfer rotational motion and torque between the rotating members as a function of the axial compression of such plates by a clutch actuator.

The clutch actuator includes an annular, fluid responsive piston which is operative to apply a compressive force to the interleaved plates. To economize on space, such hydraulic clutch assemblies are normally designed with a hydraulic piston housing defining a fluid receiving chamber for telescopically accommodating the piston. One or more fluid passageways are provided to supply a fluid column to the hydraulic piston chamber sufficient to control piston displacement.

Quality shifts between gear ratios require precise and timely activation of an oncoming hydraulic clutch assembly and deactivation of another hydraulic clutch assembly. A quality shift in a gear drive assembly requires that total shift time between gear ratios is maintained at a minimum. By maintaining minimal shift times, the momentum imparted to the associated tractor or agricultural implement by one clutch carries over to the next clutch operation. Problems can result when the total shift time is excessive. When total shift time is excessive, tractor momentum is lost thus imparting more load to the oncoming clutch or cessation in tractor movement.

To effect rapid clutch engagement, a pressurized fluid flow column is delivered to the fluid receiving chamber. The fluid flow pressure is usually greater than that required to effect one hundred per cent of clutch torque capacity. The increased flow pressure is provided to very rapidly move the clutch actuator from a rest position to an engaged position. When the actuator arrives at its engaged position, however, there is a sudden deceleration of the actuator and the fluid column behind the actuator. The engagement of the actuator with the interleaved plates imparts a high-impact load to the clutch assembly resulting in a relatively high torque peak.

Although attractive because of their size and weight benefits, such clutch designs are not without problems. First, a relatively high torque peak results from the sudden impact of the clutch actuator with the clutch assembly. As such, a shearing force or action is imparted to the spline connection between the clutch plates and their respective rotational members. The repeated application of such shearing forces can, ultimately, destroy the spline connection between the clutch plates and an associated rotating member. Moreover, the sudden impact of the clutch actuator against the clutch assembly causes a relatively high impact load which is detrimental to the life of the clutch assembly. Furthermore, the sudden impact of the clutch actuator with the clutch assembly and the sudden deceleration of the fluid column creates a "water hammer" effect. Besides structural damage, such "water hammer" effect can generate an undesirable noise emanating from the transmission.

In view of the foregoing, the following criteria must be considered when attempting to find a solution to the above-captioned problems. Any purported solution to such problems cannot significantly effect the total shift time between gear ratios. Because of limited space constraints, any purported solution to such problems cannot occupy very much space. Moreover, any purported solution to the above-captioned problems must not significantly affect the torque capacity of the clutch.

In an effort to limit shift shocks incurred when the piston arrives at its engaging position with the clutch plates, it is known to use one Belleville spring positioned on that side of the clutch plates opposite to the clutch actuator. Such construction, however, undesirably requires linear displacement of the clutch plates on their splines attendant to cushioning. Moreover, the provision of one Belleville spring does not afford sufficient spring force necessary to solve the above-captioned problems.

SUMMARY OF THE INVENTION

In view of the foregoing, and in accordance with the present invention, there is provided a clutch assembly design that significantly reduces the impact loading to the clutch assembly thereby lowering the torque peak in a rapidly engaging powershift clutch. The compact clutch design of the present invention neither significantly affects shift time between gear ratios nor significantly affects clutch torque capacity.

In accordance with the present invention, the improved clutch assembly is typically provided in a transmission for coupling/uncoupling, in a power transmitting relationship, a pair of relatively rotatable members of the transmission. Such rotatable members usually define driving and driven parts within the transmission. The clutch assembly includes a series of axially aligned and interleaved plates operably effective when axially compressed to couple the first and second members of the transmission. A fluid pressure operated clutch actuator is provided at one end of the plates for regulating the operable effectiveness of the clutch assembly. The clutch actuator has an annular clutch engaging face area.

The clutch assembly of the present invention further includes a housing which is rotatable with either the first or second rotatable transmission member. The housing defines a fluid receiving chamber within which the clutch actuator is accommodated. The clutch actuator is linearly accelerated toward the clutch assembly in response to pressurized fluid acting against an annular rear face of the clutch actuator exposed to fluid pressure.

A series of deflectable springs are arranged between the annular face area of the actuator and the interleaved plates. These deflectable springs provide a gradual deceleration of the clutch actuator after the springs are deflected to a load greater than the product of the annular rear face area of the clutch actuator exposed to fluid pressure and the supply fluid pressure.

In a preferred form of the invention, the deflectable springs include a series of stacked Belleville springs. Each spring in the stack of springs has a relatively high height to thickness ratio in a range of about 1.6:1 to about 2.1:1. Preferably, at least three Belleville springs are stacked in a parallel relationship relative to one another. The Belleville springs have a cumulative peak load range which is substantially equivalent to the supply fluid pressure required to fully engage the clutch assembly.

Each of the springs define inside and outside diameters. The inner and outer diameters of the annular engaging face area provided on the clutch actuator are, respectively, larger than and smaller than the inside and outside diameters of the springs. By such construction, the engaging face area on the clutch actuator contacts the springs at a location away from the inner and outer diameters of the springs.

In a preferred form of the invention, an annular reaction plate is provided between one end of the interleaved plates of the clutch assembly and the springs. The annular reaction plate includes an annular engaging face, the outside diameter of which is smaller than the outside diameter of the springs. As such, the spring contact radius of the reaction plate is less than the outer diameter of the springs.

In a preferred form of the invention, the fluid receiving chamber in the housing is pressurized by an accumulator. As the accumulator discharges to actuate the clutch assembly, accumulator pressure drops to about sixty per cent of normal operating pressure. At this point, the clutch actuator contacts the Belleville springs deflecting them a short distance causing the clutch torque capacity to rise to about sixty per cent of its final capacity. As the clutch actuator continues to linearly move toward the clutch assembly, the Belleville springs are further deflected. The clutch actuator will decelerate, however, since the spring force is greater than the pressure force originating from the accumulator. The force transmitted by the Belleville springs to the clutch assembly is equal to the spring force until the springs reach their flat position. At this point, the linear velocity of the clutch actuator and the fluid pressure in the fluid receiving chamber have significantly decreased thus cushioning or eliminating the final impact load to the clutch pack. Therefore, the torque peak is also reduced or eliminated.

Other features and advantages of the present invention will become readily apparent in the following detailed description, the appended claims, and the accompanying claims.

BRIEF DESCRIPTION OF THE DRAWINGS

FIG. 3 a graphic illustration of torque peaks which are generated by a clutch assembly with and without the principles of the present invention applied thereto.

DETAILED DESCRIPTION OF THE PRESENT INVENTION

Figure 1:
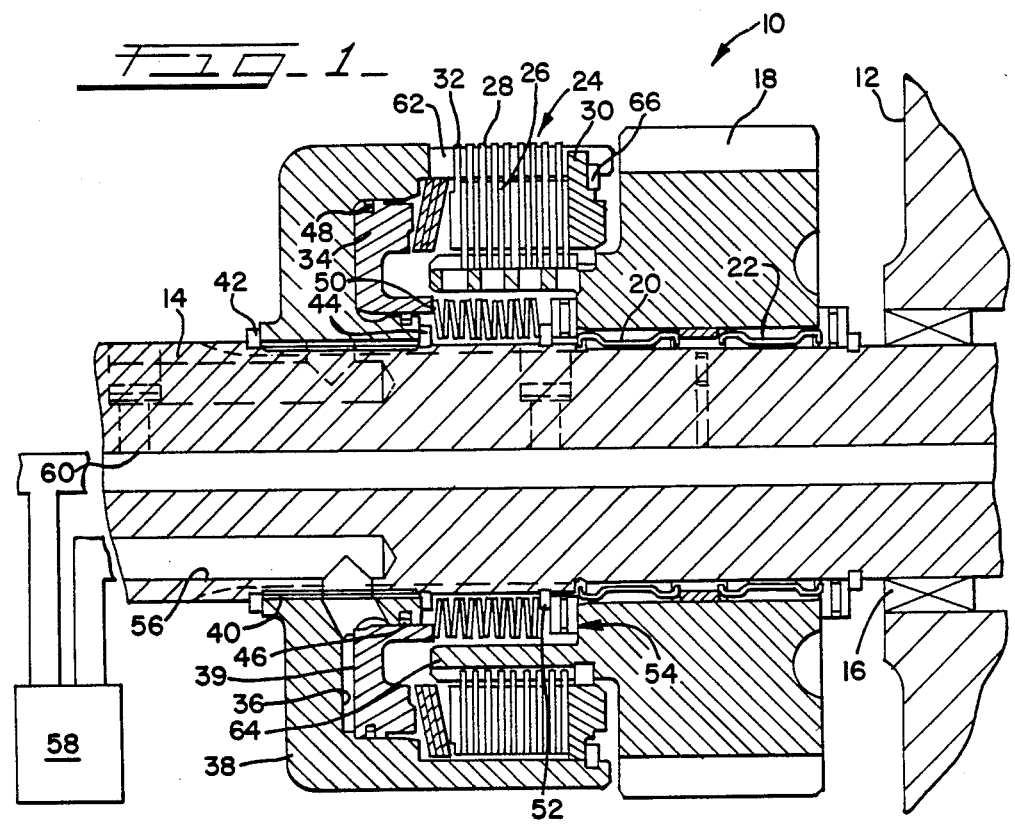
FIG. 1 is a longitudinal sectional view of a mechanism having a clutch assembly embodying the principles of the present invention.

While the present invention is susceptible of embodiment in various forms, there is shown in the drawings and will hereinafter be described, a preferred embodiment of the invention with the understanding that the present disclosure is to be considered as an exemplification of the invention and is not intended to limit the invention to the specific embodiment illustrated.

Referring now to the drawings, wherein like reference numerals indicate like parts, a powershift clutch driven unit or assembly embodying the principles of this invention is shown incorporated in a transmission apparatus 10, such as for a tractor. The illustrated clutch assembly may be one of a series of such clutches arranged within the transmission to provide a variety of torque-multiplying gear ratios.

As illustrated, the apparatus 10 includes a housing 12 having a shaft 14 journaled for rotation relative to the housing. Suitable bearing means 16 may be provided to rotatably support the shaft 14. Coaxially arranged on the shaft for rotation is a rotatable member 18. In this embodiment, member 18 is illustrated as a gear forming part of a gear train. Gear 18 can be rotatably arranged on shaft 14 by bearing means. In the illustrated embodiment, such bearing means includes axially spaced bearing sets 20 and 22.

A friction clutch assembly 24 provides a frictional coupling between shaft 14 and rotatable member 18. Clutch assembly 24 includes a pack of axially aligned interleaved friction discs or plates 26 and 28. A pressure plate 30 is arranged at one end of the pack of plates 26, 28. A reaction plate 32 is arranged at the opposite end of the plates 26, 28. One group of plates 26 or 28 may be provided with a friction facing material which is selected in combination with a lubricating fluid to provide a predetermined coefficient of friction between the plates or discs 26, 28. When sufficient axial pressure is applied to the plates, a drive connection is established and motion is transmitted between shaft 14 and rotatable member 18. As will be understood, torque transfer and rotation between shaft 14 and member 18 is controlled as a function of the axial compression of the frictional elements as determined from the amount or level of pressure applied to the clutch assembly.

A fluid pressure operated annular clutch actuator 34 is arranged at one end of the plates for applying an axial compressive force against one end of the clutch assembly. The clutch actuator is mounted for axial displacement in a fluid receiving chamber 36 defined by a housing 38. An annular rear face 39 of the actuator 34 is exposed to the fluid pressure in chamber 36 of housing 38. Housing 38 is spline connected, as at 40, with the shaft 14 and rotates therewith. A pair of snap rings 42 and 44 prevents axial displacement of the housing along shaft 14.

Clutch actuator 34 is appropriately sealed to retain hydraulic pressure rearward thereof in the chamber 36 by means of a pair of conventional annular oil seals 46 and 48. A series of annular, dished resilient members or springs 50 are coaxially arranged between the actuator 34 and a shoulder or snap ring 52 provided on shaft 14. Bearing means 54, in the form of a thrust washer assembly, is provided between springs 50, 52 and the rotatable member 18 to permit relative rotation therebetween. By such construction, the clutch actuator is normally urged to the left, as seen in FIG. 1, into a non-engaging position.

The fluid receiving chamber 36 provided in housing 38 is in fluid communication with a fluid supply conduit or control passage 56 provided in shaft 14. As illustrated, control passage 56 is fluidically connected to a conventional accumulator 58. As is conventional, accumulator 58 receives fluid from another fluid passage 60 which may be axially provided in shaft 14.

In the illustrated embodiment, housing 38 includes an elongated, annular and splined extension 62. Extension 62 is telescopically arranged a radial distance from another elongated, annular and splined extension 64 provided on rotating member 18. Plates 28 are spline connected to the extension 62 on housing 38 such that they rotate with shaft 14. The pressure plate 30 and annular reaction plate 32 are likewise spline connected, at opposite ends of the interleaved plates, to the extension 62. The pressure plate 36 is axially located on extension 62 by a suitable limit stop or snap ring 66. Similarly, alternate plates 28 are spline connected to the extension 64 provided on member 18.

Figure 2:
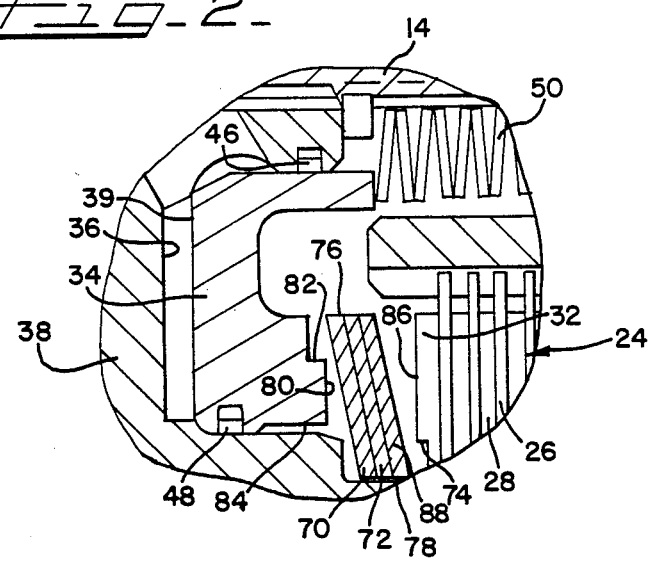
FIG. 2 is an enlarged view of a portion of FIG. 1.

As best illustrated in FIG. 2, a series of deflectable springs 70, 72 and 74 are arranged in parallel between the clutch actuator 34 and the interleaved plates 26, 28 of the clutch assembly. As will be described, positioning of the springs 70, 72 and 74 adjacent to the clutch actuator 34 provides a cushioning effect during clutch engagement without undesirably requiring the interleaved clutch plates to linearly move on or along their spline connections. As will be understood, arranging the springs in the manner described will not effect the torque capacity of the clutch assembly.

Preferably, springs 70, 72, 74 are Belleville springs the design of which takes advantage of the characteristic force-displacement curve for this type of spring. As illustrated, the springs are stackable in a parallel relationship relative to each other to increase load capacity. In their stacked order, springs 70, 72 and 74 have a cumulative peak load range which is substantially equivalent to the supply fluid pressure required to fully engage the clutch assembly. Each spring has a relatively high height to thickness ratio in the range of about 1.6:1 to about 2.1:1. By choosing a relatively high height to thickness ratio, it is possible to arrive at a certain minimum force (equal to the pressure in chamber 36) at a relatively small displacement (eighteen per cent) such that most of the displacement (eighty-two per cent) takes place above said certain minimum force.

To further improve the load distribution within the clutch assembly and thereby provide a better wear life of the clutch, the contact radius for the springs has been moved away from inner and outer diameters 76 and 78, respectively, of the springs. To effect such ends, and as best illustrated in FIG. 2, clutch actuator 34 is provided with an annular clutch face engaging area 80. Clutch face engaging area 80 is provided with inner and outer diameters 82 and 84 which are, respectively, larger than and smaller than the inside and outside diameters 76 and 78 provided on the springs 70, 72, 74.

In a similar manner, the annular reaction plate 32 includes an annular spring engaging face 86. The outside diameter 88 of the spring engaging face 86 provided on the annular reaction plate 32 is smaller than the outside diameter 78 of the springs.

In operation, the clutch assembly is actuated by pressure from the accumulator 58. As the accumulator discharges fluid to the receiving chamber 36 of housing 38, accumulator pressure drops to about sixty per cent of normal operating pressure. At this point, the annular clutch engaging face 80 of the clutch actuator 34 contacts the stack of Belleville springs 70, 72, 74 deflecting them a short distance causing the clutch torque capacity to rise to about sixty per cent of the final capacity. As the clutch actuator 34 continues to linearly move under the influence of the rising pressure in chamber 36 acting against the annular face 39 of actuator 34, the Belleville springs 70, 72, 74 are further deflected. The clutch actuator 34 will decelerate, however, because the spring force of springs 70, 72 and 74 is greater than the pressure force originating from the accumulator 58.

The force transmitted by the Belleville springs 70, 72 and 74 to the clutch assembly is equal to the spring force until the springs 70, 72, 74 reach their flat position. At this point, however, the linear velocity of the clutch actuator 34 and the fluid pressure behind the actuator 34 have significantly decreased thus reducing or eliminating the final impact load to the clutch assembly. Therefore, the torque peak of the clutch is significantly reduced or eliminated.

FIG. 3 graphically illustrates torque peaks generated by a powershift clutch assembly with and without Belleville springs. The abscissa in this graph represents passage of time after a gear shift is initiated. The ordinate in this graph illustrates clutch torque capacity. Line 90 in the graph illustrates accumulator pressure. As indicated, when the accumulator 58 discharges fluid to actuate the clutch assembly, the pressure in the accumulator 58 drops to about sixty per cent of normal operating pressure. At this point, the clutch actuator 34 contacts the springs 70, 72, 74 deflecting them a short distance causing clutch torque capacity to rise to about sixty per cent of the final capacity.

As indicated in FIG. 3, the clutch actuator 34 must travel about ten per cent further to develop sixty per cent torque capacity (equal to engine torque) in the clutch assembly than it would have to travel without the presence of springs. Thus, the shift time is lengthened by about ten per cent. A ten per cent increase in shift time, however, is a reasonable sacrifice given the benefits accorded by the present invention.

As long as the springs 70, 72 and 74 offer a greater spring force than the effective pressure acting on the actuator, there will be a deceleration of the actuator 34. As graphically illustrated in FIG. 3, the travel of the clutch actuator 34 is in a deceleration mode for about forty-five per cent of the length of its travel. This extent of deceleration provides a significant reduction in the effect actuating pressure peaks have on the clutch assembly and, as illustrated, lowers the torque peak of the clutch assembly. As is indicated by broken line 92 in FIG. 3, a clutch assembly without Belleville springs normally has a relatively high impact load imparted thereto when a clutch actuator arrives at its engaged position with the clutch assembly. This high impact loading is associated with a relatively high torque peak. Line 94 indicates the torque peak of a clutch assembly embodying the principles of the present invention. The cushioning effect imparted by the springs 70, 72 and 74 is evident from this graphic illustration.

An alternative design of the present invention involves preloading the Belleville springs 70, 72 and 74.

As will be understood, preloading the springs 70, 72 and 74 can be accomplished using several techniques. One such technique involves captively arranging the inside and outside diameters of the springs within an open-sided cavity extending from the clutch actuator such that the springs are prestressed. Such preloading of the springs will eliminate the loss of torque interruption (see FIG. 3) during a shift normally incurred due to initial deflection of an unstressed spring.

With either form of the invention, springs 70, 72 and 74 act to significantly decelerate the linear velocity of the clutch actuator 34 before its impact with the clutch assembly in a manner reducing or eliminating impact loading to the clutch assembly. As such, the associated torque peak to which the clutch assembly is subjected is also significantly reduced through use of the springs interposed in the manner described by the present invention. Moreover, the decline in pressure in the accumulator which takes place upon clutch actuation will allow the clutch actuator 34 to decelerate at a lower spring force than would be required if there was no accumulator in the system.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A clutch assembly for selectively and rapidly establishing a drive connection between first and second coaxially arranged and relatively rotatable transmission members, said clutch assembly comprising:
   a series of axially aligned and interleaved plates shiftable between engaged and released positions, some of said plates being rotatable with one rotatable transmission member and the remainder of said plates being rotatable with the other rotatable transmission member;
   a fluid pressure operated annular clutch actuator arranged at one end of said plates for applying a load to said plates causing face-to-face engagement thereof, said actuator having an annular clutch engaging face area;
   a housing rotatable with either said first or second rotatable transmission member, said housing defining a fluid receiving chamber within which said clutch actuator is accommodated for generally linear movement, said clutch actuator being linearly accelerated toward said plates in response to an annular rear face area of the clutch actuator being exposed to a sufficient supply pressure; and
   a series of belleville springs arranged between said annular clutch engaging face area and said interleaved plates, said belleville springs each having a load-deflection characteristic defined by a relatively high height to thickness ratio in a range of about 1.6:1 to about 2.1:1 and being deflectable in response to linear movement of said clutch actuator, the load-deflection characteristic of the springs providing a rapidly rising spring rate after the springs are initially deflected a relatively small amount by said actuator in a manner conditioning said plates for rapidly rising torque capacity to a rated torque and providing a generally constant spring rate for the remainder of their deflection by said clutch actuator thereby conditioning said plates to continually transfer said rated torque between the first and second transmission members, said springs acting to significantly reduce initial impact loading of the clutch actuator against the interleaved plates without substantially extending the time required to shift the plates sufficiently to establish a drive connection between the first and second transmission members.

2. A clutch assembly according to claim 13 further including an annular reaction plate provided between one end of said interleaved plates and said springs.

3. A clutch assembly according to claim 1 wherein said Belleville springs are stacked in a parallel relationship relative to one another.

4. A clutch assembly according to claim 1 wherein said Belleville springs have a cumulative peak load range which is substantially equivalent to supply fluid pressure required to fully engage the clutch assembly.

5. A clutch assembly according to claim 1 wherein each of said springs define inside and outside diameters, and wherein inner and outer diameters of said annular clutch engaging face area are, respectively, larger and smaller than the inside and outside diameters of said springs.

6. A clutch assembly according to claim 1 wherein said springs are preloaded to reduce the time required to reach the rated torque and thereby minimize torque interruption during a gear shift.

7. A clutch assembly for selectively establishing a drive connection between first and second coaxially arranged and relatively rotatable transmission members, said clutch assembly comprising:
   a series of axially aligned and interleaved plates, some of said plates being rotatable with one rotatable transmission member and the remainder of said plates being rotatable with the other rotatable transmission member;
   a fluid pressure operated annular clutch actuator arranged at one end of said plates for operating said clutch assembly, said actuator having an annular clutch engaging face area;
   a housing rotatable with either said first or second rotatable transmission member, said housing defining a fluid receiving chamber within which said clutch actuator is accommodated, said clutch actuator being linearly accelerated toward said clutch assembly in response to an annular rear face area of the clutch actuator being exposed to sufficient fluid pressure; and
   a series of deflectable belleville springs arranged between said annular clutch engaging face area and said interleaved plates for providing a gradual deceleration of the clutch actuator after the springs are deflected to a load greater than the product of the annular rear face area of the clutch actuator and the supply fluid pressure thereby reducing impact loading to the clutch assembly, each belleville spring having a relatively high height to thickness ratio in a range of about 1.6:1 to about 2.1:1 and defining inside and outside diameters, and wherein inner and outer diameters of said annular clutch engaging face area are, respectively, larger and smaller than the inside and outside diameters of said springs; and an annular reaction plate provided between one end of said interleaved plates and said springs, said reaction plate defining an annular engaging face the outside diameter of which is smaller than the outside diameter of said springs.

8. A clutch assembly for selectively and rapidly establishing a drive connection between first and second coaxially arranged and relatively rotatable transmission members, said clutch assembly comprising:
- a series of axially aligned and interleaved plates shiftable between engaged and released positions, some of said plates being rotatable with one rotatable transmission member and the remainder of said plates being rotatable with the other rotatable transmission member;
- a fluid pressure operated annular clutch actuator arranged at one end of said plates for applying a load to said plates causing face-to-face engagement thereof, said actuator having an annular clutch engaging face area;
- a housing rotatable with either said first or second rotatable transmission member, said housing defining a fluid receiving chamber within which said clutch actuator is accommodated for generally linear movement, said clutch actuator being linearly accelerated toward said plates in response to an annular rear face area of the clutch actuator being exposed to a sufficient supply pressure;
- a series of belleville springs arranged between said annular clutch engaging face area and said interleaved plates, said belleville springs having a load-deflection characteristic defined by a relatively high height to thickness ratio and being deflectable in response to linear movement of said clutch actuator, the load-deflection characteristic of the springs providing a rapidly rising spring rate after the springs are initially deflected a relatively small amount by said actuator in a manner conditioning said plates for rapidly rising torque capacity to a rated torque and providing a generally constant spring rate for the remainder of their deflection by said clutch actuator thereby conditioning said plates to continually transfer said rated torque between the first and second transmission members, said springs acting to significantly reduce initial impact loading of the clutch actuator against the interleaved plates without substantially extending the time required to shift the plates sufficiently to establish a drive connection between the first and second transmission members; and
- accumulator means for providing fluid under pressure to said fluid receiving chamber in a manner permitting relatively rapid and substantially unrestricted filling of said chamber and causing said clutch actuator to apply a load against said interleaved plates, said accumulator means experiencing a partial drop in pressure during filling of said chamber thereby providing a reduction in the impact loading of the clutch actuator against the interleaved plates.

* * * * *